United States Patent [19]
Donovan, deceased et al.

[11] 4,390,580
[45] Jun. 28, 1983

[54] HIGH PRESSURE LAMINATE FOR ACCESS FLOOR PANELS

[76] Inventors: William J. Donovan, deceased, late of Montclair, N.J.; by A. Gerard Coppola, executor, 17 Brookside Cir., Wilbraham, Mass. 01095; William D. Sanford, Box 98, R.D. 3, Newton, N.J. 07860

[21] Appl. No.: 296,498

[22] Filed: Aug. 26, 1981

[51] Int. Cl.³ .............................................. B32B 3/04
[52] U.S. Cl. ................................. 428/68; 428/167; 428/172; 428/44; 156/268
[58] Field of Search ................ 428/172, 167, 44, 464, 428/503, 68; 156/257, 268

[56] References Cited
U.S. PATENT DOCUMENTS

| | | |
|---|---|---|
| 659,453 | 10/1900 | Plant . |
| 766,526 | 8/1904 | Rivers . |
| 998,203 | 7/1911 | Rivers . |
| 2,286,068 | 6/1942 | Deskey . |
| 2,363,492 | 11/1944 | Bailey .............................. 156/268 |
| 2,363,927 | 11/1944 | Bailey .............................. 428/167 |
| 2,564,055 | 8/1951 | Elmendorf . |
| 2,576,698 | 11/1951 | Russum . |
| 2,593,863 | 4/1952 | Elmendorf . |
| 2,653,889 | 9/1953 | Hager et al. . |
| 2,713,014 | 7/1955 | Johnson . |
| 2,782,468 | 2/1957 | Leonardson et al. . |
| 2,860,385 | 11/1958 | Cohn . |
| 2,945,389 | 7/1960 | Casazza . |
| 3,085,482 | 4/1963 | Yakubik . |
| 3,287,203 | 11/1966 | Elmendorf . |
| 3,475,261 | 9/1969 | Ettore et al. . |
| 3,511,743 | 5/1970 | Rach . |
| 3,539,137 | 11/1970 | March . |
| 3,554,850 | 1/1971 | Kuhle . |
| 3,607,589 | 8/1971 | Schirtzinger . |
| 3,809,601 | 5/1974 | Fletcher . |
| 3,859,157 | 1/1975 | Morgan .............................. 156/268 |
| 3,860,478 | 1/1975 | Bartlow et al. . |
| 3,943,022 | 3/1976 | Susnjara .............................. 156/257 |
| 3,969,868 | 7/1976 | Bainter et al. ...................... 428/167 |
| 4,102,724 | 7/1978 | Taylor .............................. 156/257 |
| 4,139,669 | 2/1979 | Chang .............................. 428/167 |
| 4,142,341 | 3/1979 | Mott .............................. 52/263 |

*Primary Examiner*—George F. Lesmes
*Assistant Examiner*—Beverly Johnson
*Attorney, Agent, or Firm*—Lerner, David, Littenberg, Krumholz & Mentlik

[57] ABSTRACT

A high pressure laminate (HPL) is disclosed for use on an access floor panel. The HPL is comprised of a rigid, moisture, impervious melamine plastic layer laminated under high pressure and heat to a substrate layer comprised of a resin paper element of multiple sheets of phenolic resin impregnated kraft paper. This resin paper element has at least one groove in it, wherein material has been removed to a depth sufficient to sever enough paper sheet grain lines of the resin paper element so that, after the HPL has been adhesively bonded to the HPL receiving surface of an access floor panel, vertical expansion or contraction of the resin paper element will note elongate the bond line in the area from the edge of the HPL to the groove that creates the pivot or hinge line. An access floor panel is also disclosed.

11 Claims, 3 Drawing Figures

HIGH PRESSURE LAMINATE FOR ACCESS FLOOR PANELS

BACKGROUND OF THE INVENTION

This invention relates generally, but not exclusively, to the field of elevated access flooring, of a type in which a plurality of generally rectangular floor panels are supported above a base floor at the corners thereof, upon vertically adjustable pedestal supports for the purpose of providing space for cables, utilities, and other items connected with the various types of equipment normally disposed on the access floor.

Access floor panels are generally provided with a top surface of a decorative and wearing material more completely described as a high pressure laminate (HPL). This high pressure laminate consists of multiple sheets of phenolic resin impregnated kraft paper and an outer melamine surfaced decorative face which, under high pressure, controlled temperature and humidity, have been consolidated into a component of relatively uniform thickness. This surfacing component is adhesively bonded to the HPL receiving surface of the access floor panel employed.

The outer melamine plastic surface of the high pressure laminate is impervious to moisture penetration and thus provides a moisture barrier to one surface of the resin impregnated paper element which, on its opposite surface, exhibits a relatively high absorbent capability. Inherent in its manufacturing, the grain of all the paper sheets is uni-directional. Consequently, expansion or contraction of the resin element paper due to moisture absorption or loss is not uniform in all directions, but results in lateral dimensional changes in the ratio of approximately two to one.

Because of the melamine moisture barrier surface, a change in relative humidity affects the fibers of the resin kraft paper sheets opposite the melamine moisture barrier surface initially at the edges and the extreme fibers of the bonded surface. Given the propensity of the HPL for expansion or contraction in an approximate ratio of two to one, a change in relative humidity thus alters the stresses which existed within this component prior to the change in environment and creates an immediate tendency for the high pressure laminate to proceed into a positive or negative curvature. This inadequately restrained movement many times causes the delamination of high pressure laminate from the HPL receiving surface of the access floor panel.

The above-discussed effect has resulted in a relatively high rate of failure of access floor panels to remain stable and thus planar and usable. These panels must be replaced at substantial cost either to the manufacturer under warranty or to the buyer. Thus, it would be highly desirable to provide an inexpensive but efficient way to avoid such failures.

SUMMARY OF THE INVENTION

We have determined that the failure of access floor panels due to moisture absorption or loss can be substantially alleviated by employing, as a surfacing material, high pressure laminate comprised of a rigid, impervious melamine plastic layer laminated under heat and high pressure to a substrate comprised of multiple sheets of resin impregnated kraft paper having at least one groove in the surface thereof opposite said melamine plastic layer. Each groove is spaced from an edge of the high pressure laminate and is of sufficient depth to sever enough grain lines of the resin impregnated paper so that, when the surface of said resin paper opposite the melamine plastic layer is adhesively bonded to a high pressure laminate receiving surface of an access floor panel to form a bond line between the receiving surface and the face of the resin impregnated paper element, vertical expansion or contraction of the resin impregnated paper element will prevent critical elongation of the bond line in the area between the edge and the groove. The use of this modified high pressure laminate provides an access floor panel which will not be substantially adversely affected by variations in relative humidity of the environment above and below the access floor. The high pressure laminate of the invention results in an improved access floor panel performance in which the manufacturing cost thereof will be of a reasonably low order with the consequent wide sale, distribution and acceptance thereof.

In a preferred embodiment of the invention, the resin paper element has a plurality of grooves therein, each groove being parallel to an edge of the high pressure laminate. More preferably, high pressure laminate is rectangular in shape, and the resin paper element has four sets of a plurality of grooves, the grooves in each set being substantially parallel to each other and each set of grooves being parallel to and adjacent to an edge of the rectangular high pressure laminate so as to create a stress-relieved border area in the high pressure laminate. Of course, grooves in other arrangements can also be employed so long as they relieve the stresses caused by moisture absorption or loss, e.g., if desired, a series or plurality of grooves could be cut in the resin paper element diagonally across the corners of the high pressure laminate.

The present invention also includes access floor panels comprising (1) a support structing having a high pressure laminate receiving surface, and (2) a high pressure laminate having a rigid, impervious melamine plastic layer laminated under high pressure to multiple sheets of a resin impregnated paper element, wherein the resin impregnated paper surface of the high pressure laminate opposite the melamine plastic layer is adhesively secured to the receiving surface to form a bond line between the receiving surface and the resin impregnated paper surface, and wherein the sheets of resin paper have at least one groove therein (a) spaced from an edge of the high pressure laminate and (b) of sufficient depth so that any vertical expansion or contraction of the resin impregnated paper element will not substantially elongate the bond line in the area between the edge and the groove.

DETAILED DESCRIPTION OF THE INVENTION

Any conventional high pressure laminate now used on access flooring can be employed. High pressure laminates vary in quality and type and are available from a number of manufacturers under substantially restrictive qualifications, e.g.:

A. Clean only with damp mop and mild detergent, but preferably with a vacuum cleaner.

B. Flooding the floor with water or cleaning agents is not required and not recommended.

C. Material is not recommended for application other than on access floor manufacturers steel, aluminum, particle board, or plywood subfloors.

D. High pressure laminate guaranteed stable only when ambient conditions are forty-five percent to fifty-five percent relative humidity and 65°–75° F. and E. Actual bonding shall not be done when temperature is less than 64° F. and relative humidity is less than 35%.

It can be seen from the restrictive qualifications under which HPL is sold, that the material is prone, under many conditions, to give trouble and not remain stable. No method of making HPL acceptable for use as is under the diverse conditions of use in access flooring has yet been developed. The manufacturers have reached the limit of the art in the production of HPL without being able to overcome the limitations that exist in using the material for covering access floor panels. The instability problems of HPL as related to its use on access floor panels are moisture related and must be controlled by a method not dependent on moisture control.

No provisions exist for controlling the environment for the high pressure laminate after leaving the manufacturer, either while in transit or in storage at laminating facilities, where this component is processed for application upon access floor panels. Throughout this period, the component gains or loses moisture and reaches the point of its bonding to the surface of an access floor panel usually containing an excess of or deficiency in moisture.

In bonding the high pressure laminate to the top or high pressure laminate receiving surface of an access floor panel, a sprayed neoprene-base contact adhesive is normally employed. It has been observed that, unless the surface temperatures of the materials being bonded are thermally controlled and related to the existing atmospheric temperature so that the dewpoint and resultant surface condensation will not constantly occur, condensation can increase the moisture content of the high pressure laminate and also hinder a uniform dissipation by evaporation of the adhesive solvent from the bond line of the materials being bonded.

As explained above, changes in the moisture content of the high pressure laminate can also be caused by moisture transmittal to or from the environment of the panel. Without a precisely controlled environment which consists of an ambient relative humidity of from 45 to 55 percent and a temperature of from 68 to 72 degrees F., the inherent disproportionate stresses in high pressure laminate immediately begin to exert themselves.

HPL has the propensity and ability to expand or contract in length, width and thickness, as its moisture content varies from either relative humidity or liquid immersion from maintainance. Testing has conclusively shown that HPL with a nominal thickness of about 120 thousandths of an inch (0.120) can and does expand or contract to as much as about 6 thousandths of an inch (0.006).

Sprayed contact bond neoprene adhesives commonly in use for the bonding of HPL laminates to suitable substrates are normally applied so that a total thickness of about 4 thousandths of an inch (0.004) of neoprene remains after solvents have been completely dissipated by evaporation. The maximum advisable surface coverage by neoprene adhesives is 85 percent, so that solvents can be dissipated. This bond line cannot withstand vertical elongation of more than a nominal fifty percent maximum. Upon exceeding this amount of movement, the cured bond line will rupture. Thus, as HPL, after bonding, passes through different environmental conditions, the inevitability of bond line rupture exists if its vertical expansion or contraction exceeds about two thousandths of an inch (0.002).

If the initial change in environment results in the introduction of water or extreme humidity to the edges of HPL, the moisture creates a force of stress and a progressive increase in the thickness of the resin paper element beginning at its edge and lower surface. This expansion of the fibers or paper element exerts a vertical pressure upon the rigidly stiff and unyielding dry portion immediately above, thereby creating sufficient stress within the bond line ahead of the moist zone of the resin paper element to cause the neoprene bond line to elongate and rupture.

If the initial change in environment is a decrease in moisture content, the fibers or paper element begin to contract vertically and upwardly below the rigid, imprevious melamine top surface and a segment of the bond line elongates and/or ruptures as a result of this drying cycle. Successive wetting and drying cycles increase the area of the bond line rupture. In its extreme condition, the total bond line fails and the HPL becomes unadhered from its substrate.

When an HPL bond line rupture reaches a nominal two to three inches in length and a wet cycle then occurs, the extreme bottom fibers absorb moisture and expand. This expanded zone is restrained by the dry zone or unexpanded material directly beneath the rigid melamine surface and the HPL curls upward into an arc with a chord attachment to the HPL still adhered at the end of the bond line rupture. Sufficient stressing of the HPL during this expansion causes the affected fibers on the periphery of the panel to exceed their ability to return and a static curve upward results. The curve is more pronounced at the corners because the bond line is accessible to this cycling from two directions. Moreover, because of the effect of the grain of the phenolic resin impregnated paper, the curve occurs in a disproportionate ratio of two to one, the greater arcing occurring longitudinally along the grain line of the HPL.

In practice and usage, the above-discussed effects have resulted in a relatively high rate of failure of access floor panels to remain stable and thus planar and usable. The rupture of this bond line and the turning up of the high pressure laminate creates an unsafe, and unstable condition in the access floor panel that cannot be allowed to remain in its intended use. Replacement of panels or the providing of an environment that will not contribute to the condition of bond line failure is costly.

Utilization of the present invention will provide the means for the proper and acceptable performance of an access floor panel which uses high pressure laminate as its decorative and wearing surface. The placing of a series of parallel grooves in the phenolic resin paper element of the HPL adjacent to all edges of the HPL, so as to sever the grain lines of the paper sheets, effectively disrupts their ability to expand or contract horizontally. Also, by reducing the cross sectional area of the HPL at the top of the grooves, a pivot point or hinged effect is created adjacent to and including the melamine layer which accommodates the vertical expansion of the fibers when they are subjected to a wetting cycle.

This ability of the wetted and expanded material to pivot from the reduced cross sectional area removes the lever action stress on the bond line immediately ahead of the vertically expanding material. Any lateral expansion that may occur in the bonded resin paper element in the grooved area will move into the groove and will be ineffectual in creating a positive curve.

Different manufacturers produce high pressure laminate having varying thicknesses and expansion and contraction characteristics. Thus, the configuration, penetration, number and spacing of the grooves in accordance with the present invention will be determined by the type of high pressure laminate employed. Typically, in high pressure laminate of nominal 120 thousandths thickness, a series of four grooves along each edge can be employed, the grooves having a depth of about two-thirds of the HPL thickness and being spaced approximately five-eighths inch apart. This arrangement creates a stress-relieved border area. Preferably, corners of the top of the grooves shall be radiused or arced.

Historically, the failure of HPL to remain firmly and permanently adhered to its substrate, has occurred at the corners. The stresses that result from changes in relative humidity and water content exert a force upon the bond line that can be calculated and applied as an equal force per square inch of area. It can be seen that the center inch area of a two-foot by two-foot HPL panel resists rupture of its bond line with the help of the 575 adjacent and contiguous inch areas. Assuming that an inch area has a resulting force of 1 in its bond line, the center inch area has a collective resisting force ratio of 576 to 1. In contrast, the collective resisting force of a corner inch area is effectively 4 to 1 and the center inch area of a side is effectively 6 to 1.

The series of parallel grooves has been shown to disrupt and control the stresses in HPL. These parallel grooves are placed in the area extending from the HPL edges and progress in line form toward the center. Thus, it can now be seen that the ungrooved portion of the HPL now exists as a substantially reduced area of the whole lying within the series of parallel grooves, and further, within a substantial border area of stress-relieved HPL that no longer has a tendency to proceed to a positive curve. Therefore, the series of parallel grooves stabilize a large perimeter area and greatly increase the ability of the resisting force in the bond line of the ungrooved area to resist rupture.

In summary, by the present invention, bond line rupture, due to excessive stress, is thus prevented; the neoprene adhesive is unaffected by water and moisture, thereby providing a panel which is dimensionally stable and fulfills its design function.

An ancillary advantage of the series of parallel grooves is that of providing avenues to the edge of the HPL through which adhesive solvents can pass or dissipate more quickly and completely, thus reducing the required curing time. The series of parallel grooves also provide free passage for any moisture that may enter or exit from the underside fibers of the HPL and help prevent concentration and resultant expansion of the fibers.

The high pressure laminate of the present invention can be used in any of the conventional access floor panel constructions. Within the industry, a variety of access floor panel constructions exist. In the main there are:

A. A panel comprised of a metal top sheet bonded to a core of plywood, particle board or other suitable spacing element, which in turn is bonded to a lower metal sheet and contained by peripheral enclosures of varying designs, e.g., a metal pan. Usually this metal is steel;

B. A one piece pressure die cast panel of aluminum;

C. A panel comprised of a metal top sheet welded to a die-formed metal lower element. Again, the metal is usually steel.

Basically, the high pressure laminate of the present invention can be used with any access floor panel construction whose high pressure laminate receiving surface is comprised of a material which is sufficiently smooth and planar to accept the HPL as bonded surface thereto, e.g., such materials could also include plastics or concrete.

The grooves in the high pressure laminate of the invention will not provide means of balancing the HPL, as HPL is manufactured in an unbalanced condition and will remain so as long as one surface will readily absorb and give off moisture, while the opposite surface remains fully resistant to moisture absorption. This is in sharp comparison to the purpose of the grooving employed by U.S. Pat. Nos. 2,363,492 and 2,713,014, where grooving is employed in plywood panels to obtain a balanced laminate.

DETAILED DESCRIPTION OF THE DRAWINGS

Figure 1:
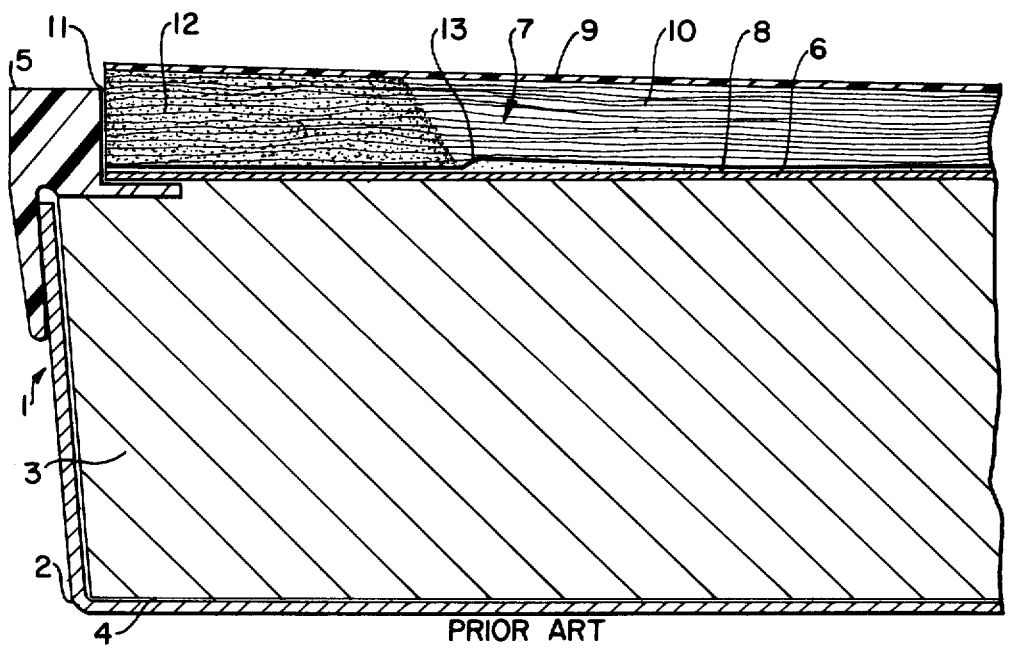
FIG. 1 is a cross-sectional view of a prior art access floor panel without grooves in the resin paper element thereof.

FIG. 1 illustrates an access floor panel 1 on which HPL is used as its wearing and decorative surface. In the embodiment shown, the basic panel is normally a two foot by two foot square panel and is assembled from components described as the metal dieformed pan 2 (usually steel) into which a support core 3, e.g., particle board, is inserted and bonded securely by a sprayed contact bond adhesive such as neoprene adhesive to form bond line 4. The core 3 has been machined to conform and accurately fit into pan 2 and has been rabetted on its top surface to receive lengths of PVC edge trim 5 which control the finished size of the panel 1. Continuing, edge trim 5 is applied to four sides, and then using the same bond line method, metal top sheet 6 (again, usually steel) is placed and adhesively adhered to the pan 2 and core 3 assembly and trim edge 5. The final assembly is the placing on and adhering to the top sheet 6 and inside edge trim 5 of a piece of HPL 7 using again the sprayed neoprene base contact adhesive to form bond line 8. The HPL 7 has a rigid, impervious outer surface 9 comprised of a rigid melamine surface of malamine impregnated decorative sheet and a resin paper element 10, usually phenolic resin impregnated kraft paper.

The entry point for moisture 11 is that point where the HPL 7 and edge trim 5 abut each other and is nominally eight feet in length on each access panel 1. It is at or along entry point 11 that moisture from excess humidity or water from cleaning and maintainance enters and affects the resin paper element 10. As this resin paper element 10 expands or increases in thickness by moisture absorption as shown by shaded area 12, it forces the rigid melamine surface 9 up. This expansion is shown in exaggeration in FIG. 1 to better illustrate how the present invention functions vis-a-vis the prior art.

The upward pressure from an increase in cross-sectional area is restrained by the rigid, impervious surface 9. Having no place to expand or pivot, the total aggregate of rigid, impervious surface 9 and unwetted resin paper element 10 is forced upwardly, elongating and/or rupturing the bond line 8 as indicated at 13 ahead of the expanding area 12 of the resin paper element 10. The elongation shown in the drawing is exaggerated for illustrative purposes.

When a drying cycle follows, the resin paper element 10 shrinks or decreases in cross-sectional thickness, and because the rigid, impervious surface 9 remains rigid and planar, the resin paper element 10, at the outer edge, moves upward and elongates and ruptures the bond line 8 behind the vertically contracting resin paper element 10.

As a result of expansion due to excess moisture or contraction due to a reduction of moisture content, and as a result of this cycling back and forth, the bond line 8 rupture at 13 and at the edge creates the condition of delaminated HPL 7, as illustrated by the dotted line portion of FIG. 1.

Figure 2:
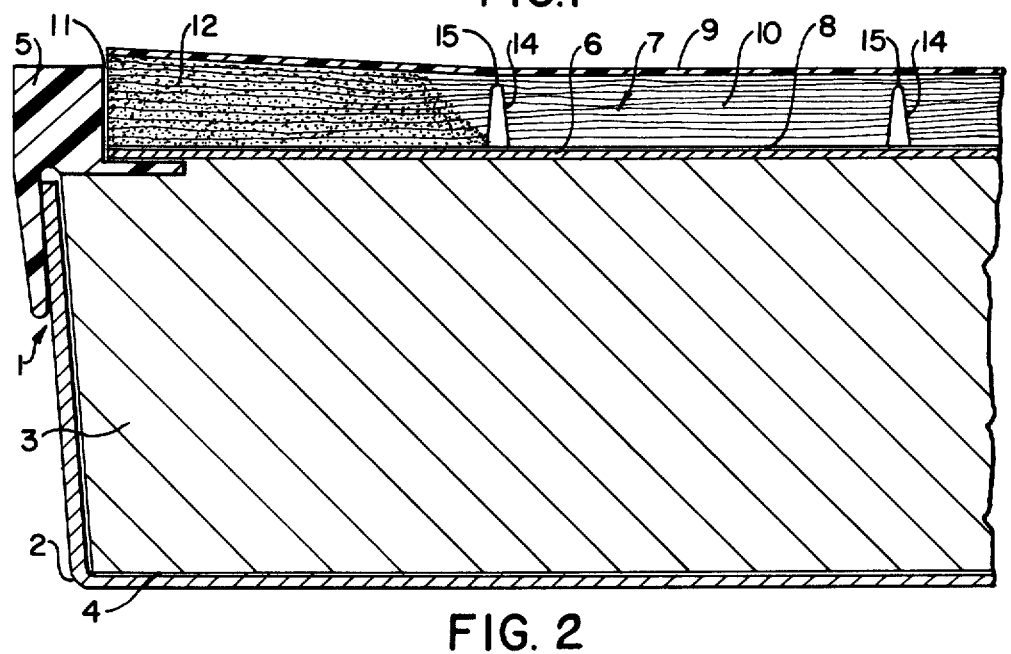
FIG. 2 is a cross sectional view of an access floor panel in accordance with the present invention.

FIG. 2 illustrates a similar panel 1, having a series of parallel grooves 14 placed in the resin paper element 10. The series of parallel grooves 14 sever the grain lines of the resin paper element 10 and produce the substantial reduction in cross sectional area at pivot point 15 or hinged line 15.

As a result of the reduced area or pivot point 15 created by the groove 14, the expanding area 12 of the resin paper element 10 is able to bend and arc up the rigid outer surface 9. The pressure to elongate on the bond line 8 ahead of the expanding area 12 is disrupted and controlled, and expanded area 12 moves, if necessary, into groove 14 effectively stopping bond line elongation and rupture. The expansion area 12 and the pivoting effect are shown in exaggeration in FIG. 2 for illustrative purposes.

Figure 3:
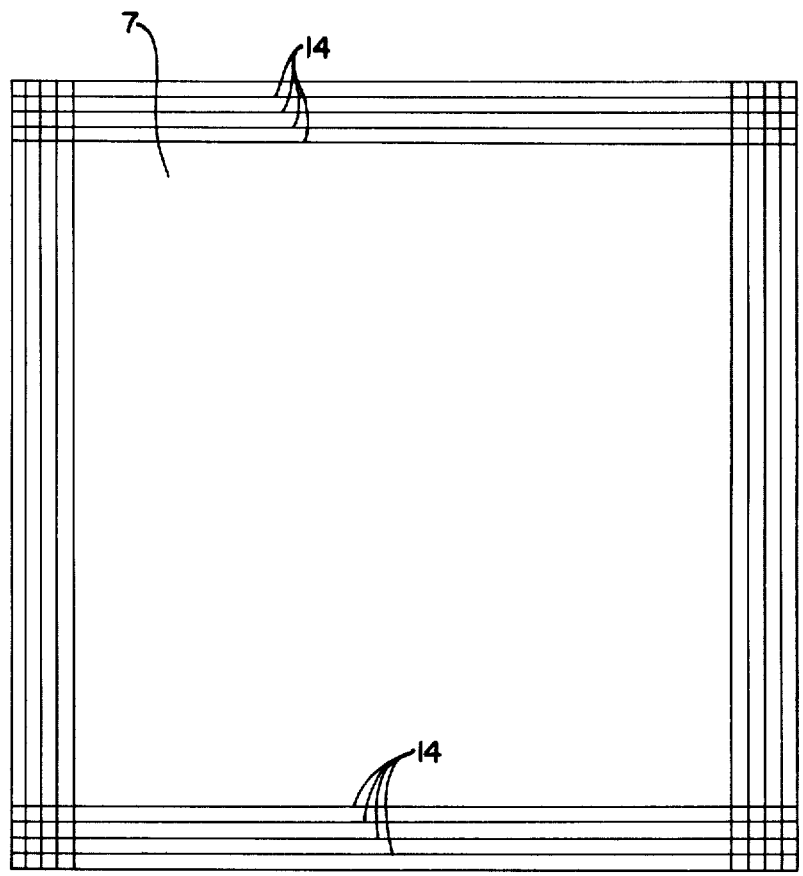
FIG. 3 is a plane view of the bottom or lower surface of one embodiment of the grooved HPL of the invention.

FIG. 3 shows a bottom view of one embodiment of a high pressure laminate in accordance with the present invention having a set of four grooves 14 along each edge of the HPL.

It will be understood that the embodiment described herein is merely exemplary and that a person skilled in the art may make many variations and modifications without departing from the spirit and scope of the invention. For example, other arrangements of grooves can be employed, such as grooving diagonally across the corners of the high pressure laminate. All such modifications and variations are intended to be included within the scope of the invention as defined in the appended claims.

What is claimed is:

1. An access floor panel comprising a support structure having a high pressure laminate receiving surface; a high pressure laminate having a rigid, impervious melamine plastic layer laminated under high pressure to a resin paper element comprised of multiple sheets of paper impregnated with resin; and an adhesive layer adhesively securing the surface of the resin paper element opposite said melamine plastic layer to said receiving surface to form a bond line between said receiving surface and said resin paper element surface; said resin paper element having at least one groove therein of sufficient depth to cut sufficient grain lines of said resin impregnated paper layer so that, when the resin impregnated paper layer expands or contracts due to moisture absorption or evaporation thereby causing the rigid melamine layer to move outwardly or inwardly with respect to the support structure and creating a stress on said bond line, said at least one groove alleviates said stress on said bond line and thereby inhibits delamination of said high pressure laminate from said support structure.

2. An access floor panel according to claim 1, wherein each groove is parallel to an edge of said high pressure laminate.

3. An access floor panel according to claim 1, wherein said high pressure laminate is rectangular in shape and wherein the resin paper element has four sets of a plurality of grooves, the grooves in each set being substantially parallel to each other and each set of multiple grooves being substantially parallel to and adjacent to an edge of the rectangular high pressure laminate so as to create a stress-relieved border area for the high pressure laminate.

4. An access floor panel according to claim 1, 2 or 3 wherein said high pressure laminate receiving surface is a metal top sheet of an access floor panel further comprising a metal pan and a support core adhesively secured to said metal pan, wherein said metal top sheet covers and is adhesively secured to said metal pan and support core assembly.

5. An access floor panel according to claim 4, wherein said support core is particle board.

6. An access floor panel according to claim 4, wherein said support core is plywood.

7. An access floor panel according to claim 4, wherein said metal top sheet is a steel top sheet.

8. An access floor panel according to claim 1, 2 or 3 wherein said high pressure laminate receiving surface is the top surface of a one piece pressured die cast aluminum panel.

9. An access floor panel according to claim 1, 2 or 3, wherein said high pressure laminate receiving surface is a metal top sheet welded to a die-formed metal lower element.

10. An access floor panel according to claim 9, wherein said metal top sheet is a steel top sheet.

11. A method for inhibiting delamination of high pressure laminate from the support structure in access flooring panels comprising the steps of providing a high pressure laminate having a rigid, impervious melamine plastic layer laminated under high pressure to a resin paper element comprised of multiple sheets of paper impregnated with resin; cutting at least one groove in the resin impregnated paper layer; and adhesively securing the surface of the resin paper element opposite said melamine plastic layer to a receiving surface of a support structure for the access flooring panel to form a bond line between said receiving surface and said resin paper element surface; wherein said cutting provides said at least one groove with sufficient depth to cut sufficient grain lines of said resin impregnated paper layer so that, when the resin impregnated paper layer expands or contracts due to moisture absorption or evaporation thereby causing the rigid melamine layer to move outwardly or inwardly with respect to the support structure and creating a stress on said bond line, said at least one groove alleviates said stress on said bond line and thereby inhibits delamination of said high pressure laminate from said support structure.

* * * * *